United States Patent [19]
Ure

[11] Patent Number: 5,112,670
[45] Date of Patent: May 12, 1992

[54] QUASI-RANDOMLY/SERIALLY ACCESSIBLE MASS STORAGE MEDIUM

[75] Inventor: Michael J. Ure, Arlington, Va.

[73] Assignee: Vastor Inc., Menlo Park, Calif.

[21] Appl. No.: 737,332

[22] Filed: Jul. 29, 1991

[51] Int. Cl.$^5$ .............................................. B32B 3/00
[52] U.S. Cl. ................................. 428/156; 428/157; 428/192; 428/906; 428/913; 360/134
[58] Field of Search ............... 428/156, 157, 192, 906, 428/913; 360/134

[56] References Cited

U.S. PATENT DOCUMENTS

| | | |
|---|---|---|
| 3,262,122 | 7/1966 | Fleicher et al. . |
| 3,663,752 | 5/1972 | Froschle . |
| 4,199,783 | 4/1980 | Huignard et al. . |
| 4,515,879 | 5/1985 | Kuehnle et al. . |
| 4,524,925 | 6/1985 | Haddock . |
| 4,567,585 | 1/1986 | Gelbart . |
| 4,633,455 | 12/1986 | Hudson . |
| 4,661,941 | 4/1987 | Bell et al. . |
| 4,686,597 | 8/1987 | Johnston . |
| 4,753,864 | 6/1988 | Bouldin et al. . |
| 4,807,213 | 2/1989 | Chung et al. . |
| 4,814,925 | 5/1989 | Beaujean . |
| 4,815,067 | 3/1989 | Webster et al. . |
| 4,818,852 | 4/1989 | Haddock et al. . |
| 4,939,715 | 7/1990 | Vogelgesang et al. . |
| 4,970,707 | 11/1990 | Hara et al. . |
| 4,999,827 | 3/1991 | Miyaoka . |

Primary Examiner—Patrick J. Ryan
Assistant Examiner—Elizabeth Evans

[57] ABSTRACT

An information-bearing tape is caused to have a stepped profile. More particularly, the tape is caused to have a non-uniform cross section of lesser thickness adjacent one edge of the tape than at another portion of the tape. When the tape is wound, gaps remain between adjacent loops of tape along the one edge. These gaps may be used in conjunction with a suitable information sensor to access the tape in a quasi-random manner. Once the information sensor has been inserted in the gap next to the right tape loop, at most a single rotation of the tape drive is needed to access any information located in that tape loop. In effect, the tape loops define independently accessible cylinders.

3 Claims, 5 Drawing Sheets

QUASI-RANDOMLY/SERIALLY ACCESSIBLE MASS STORAGE MEDIUM

BACKGROUND OF THE INVENTION

The present invention relates to mass information storage media and more particularly to a mass storage medium that in addition to being serially accessible is quasi-randomly accessible.

Optical tape mass information storage systems are known, for example as described in U.S. Pat. Nos. 3,262,122 and 4,199,783, incorporated herein by reference. Optical tape enjoys the same high storage density as the more popular compact disc, but because of the vastly greater surface area of a typical optical tape, it has a much greater overall storage capacity than a compact disc. Unfortunately, this advantage has often been more than offset by the disadvantage that optical tape has been only serially accessible. Absent some knowledge a priori of how and in what order information will be retrieved from the optical tape that may be taken into account in arranging information on the tape, a typical access requires an average of half the length of the tape to be wound from one reel to another in order to retrieve a given piece of information. Such an operation may take minutes, effectively preventing optical tape from finding widespread application in the real-time interactive computer environment. If the average access time of optical tape could be reduced from on the order of minutes to on the order of seconds, a myriad of applications in archival information storage and super-massive databases would be opened up.

SUMMARY OF THE INVENTION

According to the present invention, an information-bearing tape is caused to have a stepped profile. More particularly, the tape is caused to have a non-uniform cross section of lesser thickness adjacent one edge of the tape than at another portion of the tape. When the tape is wound, gaps remain between adjacent loops of tape along the one edge. These gaps may be used in conjunction with a suitable information sensor to access the tape in a quasi-random manner. Once the information sensor has been inserted in the gap next to the right tape loop, at most a single rotation of the tape drive is needed to access any information located in that tape loop. In effect, the tape loops define independently accessible cylinders.

DETAILED DESCRIPTION OF THE PREFERRED EMBODIMENT

Figure 1A:
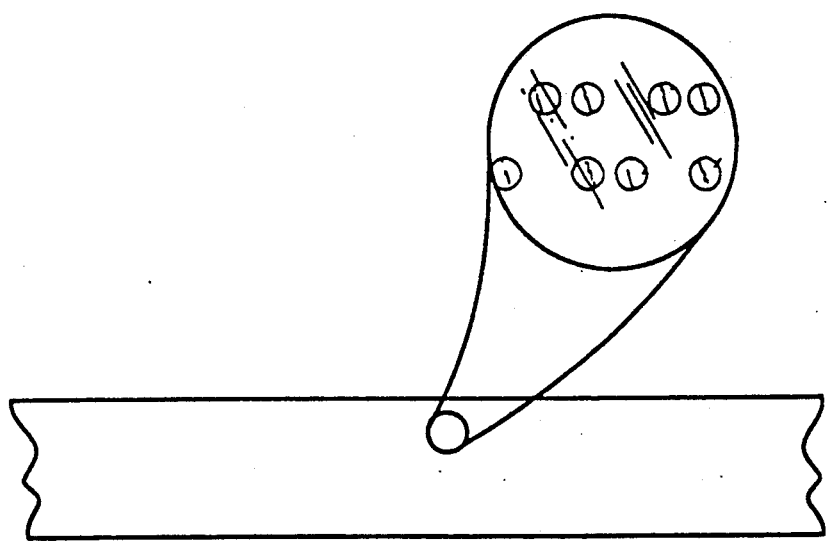
FIG. 1a is an illustration of a length of conventional optical tape.
Figure 1B:
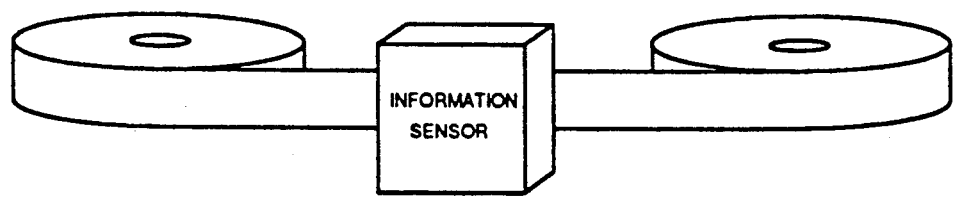
FIG. 1b is a simplified diagram of part of a conventional optical tape information storage system.

Referring to FIG. 1a, convention optical tape is typically formed of an ablative metal film (for example, tellurium) or a thermally sensitive dye layer (for example, pthalocyanine) suitably affixed to a sythetic resin substrate, for example of a type marketed by DuPont under the trademark MYLAR. Information is stored on the tape by exposing, imaging and heating dots on the tape using a laser light source so as to form pits or darkened regions. The enlarged portion of FIG. 1a shows an example of the microscopic appearance of the tape after information has been stored thereon. As seen in FIG. 1b, in an information storage system using the conventional optical tape, the tape is wound between two reels across the path of a laser-equipped informaiton sensor. To retrieve a particular piece of information, the tape must be wound until that piece of information opposes the information sensor.

Figure 2A:
FIG. 2a is an illustration of a length of computer tape according to the present invention.
Figure 2B:
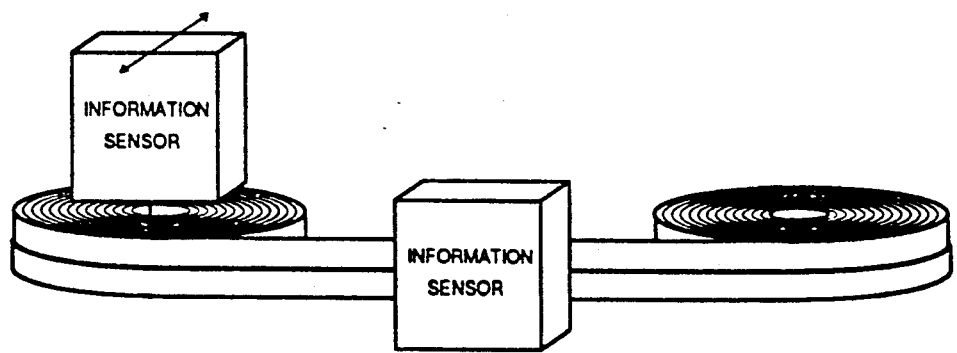
FIG. 2b is a simplified diagram of part of an information storage system in which the present invention is employed.
Figure 2C:
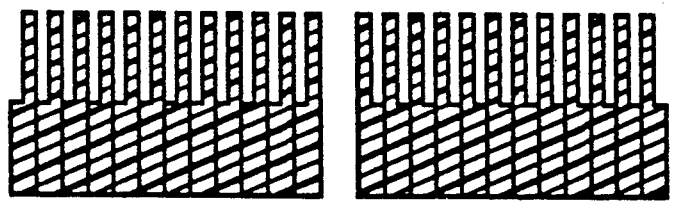
FIG. 2c is a sectional view of a tape reel in the information storage system of FIG. 2b.

Referring now to FIG. 2a, according to the present invention, a digital information-bearing tape is caused to have a stepped profile. More particularly, the tape is caused to have a non-uniform cross section of lesser thickness adjacent one edge of the tape than at another portion of the tape. When the tape is wound, gaps remain between adjacent loops of tape along the one edge. As seen in FIG. 2b, these gaps may be used in conjunction with a suitable information sensor to access the tape in a quasi-random manner. Once the information sensor has been inserted in the gap next to the correct tape loop, at most a single rotation of the tape drive is needed to access any information located in that tape loop. In effect, the tape loops define independently accessible cylinders as seen in FIG. 2c.

The stepped-profile tape may be formed by joining two tapes of different widths by heat fusion or possibly by use of a suitable adhesive. The two tapes may be of standard thickness such that the resulting stepped-profile tape is twice as thick as a conventional tape. Preferrably, however, the thickness of the constituent tapes are adjusted to be no thicker than necessary to assure that the laminated tape will have sufficient strength. The relative widths of the two constituent tapes will therefore have to be taken into account. As seen in FIG. 2b, only the thin portion of the laminated tape is quasi-randomly accessible. The thick portion of the laminated tape may nevertheless be used to store information that may be serially accessed in conventional fashion. For stability, it will generally be desireable for the narrow consitutent tape to be no less than one quarter of the width of the wide constituent tape. The narrow tape may be wider depending on the desired proportion of quasi-randomly and serially accessible data on the laminated tape.

Although a preferred embodiment of the present invention has been described in terms of optical tape, the invention is also applicable to other kinds of computer tapes. It will therefore be apparent to one of ordinary skill in the art that the present invention can be embodied in other specific forms without departing from the spirit or essential character thereof. The described embodiment is intended to be in all respects illustrative and not restrictive. The scope of the invention is indicated by the appended claims rather than the foregoing description, and all changes which come within the meaning and range of equivalents thereof are intended to be embraced therein.

I claim:

1. An information-bearing tape having a stepped profile, wherein said tape has a non uniform cross section of lesser thickness adjacent one edge of said tape than at another portion of said tape, such that when said tape is wound, gaps remain between adjacent loops of tape along one edge.

2. The information-bearing tape of claim 1 wherein said tape is digital.

3. The information-bearing tape of claim 2 wherein said tape is optical.